United States Patent Office 3,222,296
Patented Dec. 7, 1965

3,222,296
LEWIS BASE STABILIZATION OF POLYMERIZA-
TION CATALYST IN STORAGE
Victor D. Aftandilian, Watertown, Mass., assignor to
Cabot Corporation, Boston, Mass., a corporation of
Delaware
No Drawing. Filed July 29, 1963, Ser. No. 298,493
11 Claims. (Cl. 252—429)

This invention relates to catalyst components and more specifically to a means for the stabilization of catalyst components.

Valuable catalyst components of the type

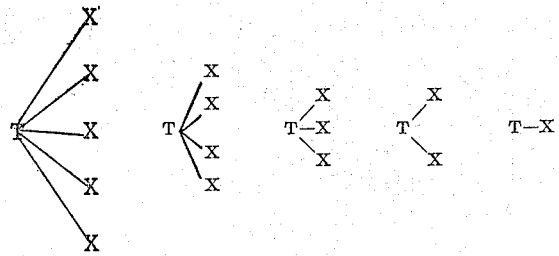

wherein T is chosen from the group consisting of the metals of Groups IVa, Va and VIa; each X is any halogen; and where said structures are chemically linked directly from T to at least one oxygen atom on the surface of a finely-divided inorganic solid have been disclosed, for instance in U.S. application Serial No. 278,414, by Orzechowski and MacKenzie, filed May 6, 1963, now abandoned. In addition, said application discloses a process for the production of said catalyst components by contacting, for example, at temperatures between 0° C. and 300° C. for varying periods of time, a finely-divided inorganic solid having an average particle diameter of less than about 0.1 micron and bearing at least about $1 \times 10^{-4}$ equivalents per gram of hydroxyl groups in the surface thereof with a compound conforming to the empirical formula $$TO_aX_b$$

where T is chosen from the group consisting of the metals of Groups IVa, Va and VIa of the Mendeleev Periodic Table; O is oxygen; $a$ is a number from 0 to 2; each X is any halogen; and $b$ is a number from 1 to 6.

It is further disclosed, both in the said application and in others, e.g. in U.S. applications 218,196 and 268,589, to Orzechowski and MacKenzie, filed August 1, 1962, and March 28, 1963, respectively, that active catalysts are produced by contacting said components under certain conditions with an organometallic compound such as an aluminum alkyl or a Group IVb metal or metalloid hydride. Although catalyst components of the above-described type are relatively resistant towards certain modes of degradation such as oxidation, it has been discovered that said components are deleteriously affected by the presence of hydrogen halides. It has further been discovered that contact between said catalyst components and water normally ultimately results in the release of hydrogen halide.

Obviously then, any contact between water and said catalyst components presents a serious problem inasmuch as the hydrogen halide produced often renders the quantity and/or properties of the polymer product produced under any given set of conditions subject to undesirable variation. It is further obvious that the prevention of any exposure of said catalyst components to an ubiquitous substance such as water in commercial usage wherein relatively large amounts of catalyst components are often produced, stored and subsequently diluted with solvents prior to activation and usage is costly in terms of equipment and/or operations.

Accordingly, it is a principal object of the present invention to provide an improved catalyst component composition.

It is another object of the present invention to provide a process for the prevention of catalyst component degradation.

It is another object of the present invention to provide a catalyst component of the type disclosed in said copending applications which is resistant to degradation caused by hydrogen halide.

Other objects of the present invention will in part be obvious and will in part appear hereinafter.

In accordance with the present invention, it was discovered that in the presence of certain Lewis bases comprising nitrogen, phosphorus or arsenic, catalyst components comprising the solid product of reaction between hydroxyl groups on the surface of a finely-divided inorganic solid and a transition metal halide or oxyhalide are rendered resistant to the deleterious effects caused by hydrogen halide. It is thought, though there is no intent to be bound by this explanation, that said Lewis bases scavenge any hydrogen halide present, forming a salt or non-reactive complex, before further degradation of said catalyst component can occur. The following equations are believed to correctly illustrate the reaction that occurs between the hydrogen halide and the Lewis bases of the present invention: In Equation 1, hydrogen chloride serves as the hydrogen halide and pyridine as the Lewis base, while in Equation 2, hydrogen bromide serves as the hydrogen halide and tributylphosphine as the Lewis base:

(1)     $C_5H_5N + HCl \rightarrow C_5H_5N \cdot HCl$ (2)     $(C_4H_9)_3P + HBr \rightarrow (C_4H_9)_3P \cdot HBr$ Lewis bases suitable for use in the practice of the present invention are those compounds chosen from the group consisting of ammonia; primary, secondary and tertiary amines; secondary and tertiary phosphines; and tertiary arsines.

Specific examples of Lewis bases suitable for the purposes of the present invention are:

trimethylamine—$(CH_3)_3N$;
methylamine—$CH_3NH_2$;
diethylamine—$(C_2H_5)_2NH$;
di-i-propyl-phosphine—$(i-C_3H_7)_2PH$;
tributylphosphine—$(C_4H_9)_3P$;
methylaniline—$C_6H_5NHCH_3$;
dimethylaniline—$C_6H_5N(CH_3)_2$;
p-toluidine—$p-CH_3C_6H_4NH_2$;
pyridine—$C_5H_5N$;
piperidine—$C_5H_{10}NH$;
indole—$C_8H_6NH$;
pyrroline—$C_4H_6NH$;
pyrrolidine—$C_4H_8NH$;
pyrrole—$C_4H_4NH$;
carbazole—$C_{12}H_8NH$;
triphenylarsine—$(C_6H_5)_3As$;
triethylarsine—$(C_2H_5)_3As$;
tri-i-butylarsine—$(i-C_4H_9)As$;

and the like. Greatly preferred, however, are the tertiary amines.

The amount of Lewis base required to gain the beneficial effects in accordance with the present invention is subject to considerable variation. However, it has been found that maintenance of a concentration of between about 5 parts and about 10,000 parts and preferably between about 5 parts and about 1000 parts of the base per million parts by weight of the catalyst component is desirable. It should be borne in mind that, to some extent, the efficiency of said Lewis bases in gaining the beneficial results of the present invention is dictated by (1) the inherent basicity, and (2) the solubility of said base in the catalyst component solvent. For instance, it is well known that, as a class, secondary phosphines are somewhat weaker bases than tertiary phosphines. Accordingly, a lesser amount of tertiary phosphine than a secondary phosphine need be utilized in order to gain an equivalent level of stabilization.

Further, it is known that certain of the Lewis bases included within the above definition, such an aniline, often form colored compounds or complexes in the presence of a metal or compound of a metal. Since colored cocatalysts may discolor the polymer product subsequently produced, it is preferable that Lewis bases capable of forming colorless compounds or complexes be utilized.

The process by which the Lewis bases of the present invention can be mixed with the catalyst components is subject to considerable variation. Obviously, in order to gain maximum benefit, it is preferable that said addition take place upon completion of the production of the catalyst component or soon thereafter, thus obviating the possibility of accidental exposure of the as yet unprotected catalyst component to an environment in which hydrogen halide is present or is likely to be produced. In those cases, wherein the solid catalyst component is present in an inert hydrocarbon solvent, such as toluene, the Lewis base can be added thereto as a liquid. However, it is a simple procedure in such a case to introduce a Lewis base such as trimethylamine by bubbling said base in gaseous form directly into the catalyst component slurry as the solubility of Lewis bases in hydrocarbons is normally sufficient to gain the concentration required, i.e. between about 5 and about 10,000 parts of Lewis base per million parts of catalyst component.

Although the practice of this invention can be effected by addition of a normally liquid (at S.T.P.) Lewis base directly to the solid particulate catalyst component in the absence of a liquid medium, it is normally desirable for the sake of maximum dispersion of the base throughout the particulate catalyst component that said base be deposited from the vapor state upon the particles of catalyst component. Said procedure can be effected with relative ease by raising the vapor pressure of the Lewis base above its boiling point, by heating and/or reducing pressure and thereafter flowing the vapors on or through the particulate catalyst component, thereby depositing thereon said Lewis base.

A better understanding of the present invention can be obtained from the following examples which, however, should be construed as being illustrative in nature and as not limiting the scope of the invention:

*Example 1*

To a 2000 milliliter, three neck, glass reaction vessel equipped with a stirrer, a condenser and nitrogen inlet and outlet tubes, there is added 20 grams of "Cab-O-Sil," a pyrogenic silica produced by Cabot Corporation, which has an average particle diameter of about 10 millimicrons and a hydroxyl group content on the surface thereof of about 1.5 milliequivalents per gram. To said reaction vessel there is added 1800 milliliters of benzene and the resulting slurry is dried by being maintained at the boiling point of benzene, i.e. about 80° C., for about 24 hours while a water/benzene azeotrope is removed from the reaction vessel by periodic distillation until about 600 milliliters of distillate has been removed. The vessel is then cooled and charged with 20 millimoles of titanium tetrachloride. The resulting slurry is then refluxed for 8 hours with continuous stirring while the HCl produced is removed by a stream of dry nitrogen. Subsequently, the extent of the reaction between the titanium tetrachloride and the hydroxyl groups on the silica is determined by measuring the quantity of HCl that was produced and by testing the liquid contents of the vessel for the absence therein of titanium tetrachloride, and the said silica is found to have 20 milliatoms of titanium bound to the surface thereof. Next, a 60 milliliter sample containing 1 milliatom of titanium chemically bound to the surface of about one gram of silica is transferred to each of three identical stainless steel, stirred, one-gallon autoclaves. There is then added to each of the autoclaves about 940 milliliters of anhydrous benzene. Next, there is added to the autoclaves the following substances:

To:

Autoclave 1—0.1 millimole of water
Autoclave 2—0.1 millimole of pyridine
Autoclave 3—0.1 millimole of pyridine followed by 0.1 millimole of water All three autoclaves are then stirred for one hour at ambient temperatures at the end of which time there is introduced into each autoclave about 1 millimole of triisobutylaluminum contained in about 100 milliliters of anhydrous benzene. The autoclave are then heated to and thereafter maintained at about 80° C. with continuous stirring while pressurization to 200 p.s.i. is effected with ethylene, said pressure thereafter being maintained by the periodic introduction into said autoclaves of further amounts of ethylene. After one hour the autoclaves are cooled and vented to the atmosphere. The solid contents of each vessel are then removed, filtered, dried and weighed. In autoclave 2 there is found about 500 grams of solid polymer. In autoclave 3, there is found about 450 grams of solid polymer. In autoclave 1 there is found only about 410 grams of solid polymer.

In runs substantially identical to those reported above wherein neither water nor pyridine was added, the results were similar to the results reported relative to autoclave 2.

*Example 2*

A catalyst component is produced according to the procedure as set forth in Example 1 with the exception that different starting materials are utilized: A slurry comprising 3000 milliliters of isooctane and 40 grams of "Alon," a pyrogenic alumina produced by Deutsche Gold- und Silber-Scheideanstalt vormals Roessler which has an average particle diameter of about 10–40 millimicrons and a hydroxyl group content on the surface thereof of about 0.7 milliequivalent per gram is dried by azeotropic distillation for about 8 hours while about 600 milliliters of a water/isooctane azeotrope is removed. There is then introduced into the slurry about 20 millimoles of vanadium oxychloride and said slurry is then refluxed for 8 hours with continuous stirring while the HCl produced is removed by a stream of dry nitrogen. Subsequently, the extent of the reaction between the vanadium oxychloride and the hydroxyl groups on the alumina is determined by measuring the quantity of HCl that was produced and by testing the liquid contents of the vessel for the absence therein of vanadium oxychloride, and the said alumina is found to have 20 milliatoms of vanadium chemically bound to the surface thereof. Next, under a dry nitrogen atmosphere, a 120 milliliter sample containing about 1 milliatom of vanadium chemically bound to the surface of about two grams of alumina is transferred to each of three identical one-gallon autoclaves as in Example 1. There is then introduced into each of the autoclaves the following:

To:

Autoclave 1—1 millimole of anhydrous HCl
Autoclave 2—1.1 millimoles of trimethylamine
Autoclave 3—1.1 millimoles of trimethylamine followed by 1 millimole of anhydrous HCl.

All three autoclaves are then stirred at ambient temperature for about one hour. Thereafter, 2.1 millimoles of triethylaluminum is added and the procedure as outlined in Example 1 for the polymerization of ethylene and after-treatment of polyethylene is effected. It is found that about 500 grams of solid polymer is produced in autoclaves 2 and 3 whereas only about 100 grams of polymer is found in autoclave 1. When, under the same conditions, tributylphosphine is utilized in place of trimethylamine the results are substantially similar.

Obviously, many changes can be made in the above examples and disclosure without departing from the scope of the present invention.

For instance, in the above examples, for the purposes of clarity, a given amount of the Lewis base is added to the catalyst component and is not thereafter replenished. It is obvious that in practice, it is often desirable to maintain a minimum concentration of Lewis base in contact with the catalyst component, said minimum concentration being dictated within the range set forth above, by the conditions under which the catalyst components are stored and utilized, such as relative humidity, integrity of the processing equipment as a moisture barrier, etc.

Furthermore, although only pyridine, trimethylamine and tributylphosphine are mentioned in the above examples, other Lewis bases, either singly or in combination, are also suitable. For instance, pyrrolidine or triethylarsine or the like, or mixtures thereof are also suitable.

Accordingly, it is intended that the above disclosure be regarded as illustrative and as in no way limiting the scope of the invention.

What I claim is:

1. A process for stabilizing, during storage, a polymerization catalyst component composition comprising a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

wherein T is a metal chosen from the group consisting of the metals of Groups IVa, Va, and VIa; O is oxygen; $a$ is a number from 0 to 2; each X is any halogen; and $b$ is a number from 1 to 5; and where said structures are chemically linked directly from T to at least one oxygen atom in the surface of said solid, which process comprises maintaining during storage in the presence of said catalyst component composition between about 5 and about 10,000 parts per million parts by weight of said solid of a Lewis base chosen from the group consisting of ammonia; primary, secondary and tertiary amines; secondary and tertiary phosphines; tertiary arsines, and mixtures thereof; wherein the only substituents other than nitrogen, phosphorous and arsenic are hydrocarbon radicals and hydrogen.

2. The process of claim 1 wherein between about 5 and about 1000 parts per million parts by weight of said finely-divided solid of said Lewis base are maintained in the presence of said catalyst component composition.

3. The process of claim 1 wherein said finely-divided inorganic solid is alumina.

4. The process of claim 1 wherein said finely divided inorganic solid is silica.

5. The process of claim 1 wherein in the formula:

$$TO_aX_b$$

T is a metal of Group IVa, $a$ is 0 and each X is chlorine.

6. The process of claim 1 wherein in the formula:

$$TO_aX_b$$

T is titanium, $a$ is 0 and each X is chlorine.

7. The process of claim 1 wherein in the formula:

$$TO_aX_b$$

T is a metal of Group Va.

8. The process of claim 1 wherein said Lewis base is a tertiary amine.

9. The process of claim 1 wherein said Lewis base is pyridine.

10. The process of claim 1 wherein said Lewis base is trimethylamine.

11. The process of claim 1 wherein said Lewis base is a tertiary phosphine.

References Cited by the Examiner

UNITED STATES PATENTS

| | | |
|---|---|---|
| 2,610,167 | 9/1952 | Te Grotenhuis. |
| 2,832,759 | 4/1958 | Nowlin et al. |
| 3,009,827 | 11/1961 | Deuel et al. |
| 3,026,309 | 3/1962 | Coover. |
| 3,058,969 | 10/1962 | Coover et al. |
| 3,072,629 | 1/1963 | Coover et al. |
| 3,078,262 | 2/1963 | Herman et al. |
| 3,116,274 | 12/1963 | Boehm et al. |
| 3,152,088 | 10/1964 | Sandri et al. _____ 252—429 |

FOREIGN PATENTS 823,024   11/1959   Great Britain.

SAMUEL H. BLECH, *Primary Examiner.*

TOBIAS E. LEVOW, *Examiner.*